United States Patent
Lee et al.

(10) Patent No.: US 8,989,314 B1
(45) Date of Patent: *Mar. 24, 2015

(54) METHOD AND APPARATUS FOR JOINTLY DECODING INDEPENDENTLY ENCODED SIGNALS

(71) Applicant: Marvell International Ltd., Hamilton (BM)

(72) Inventors: Jungwon Lee, San Diego, CA (US); Jihwan P. Choi, Daegu (KR)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/215,160

(22) Filed: Mar. 17, 2014

Related U.S. Application Data

(63) Continuation of application No. 12/830,100, filed on Jul. 2, 2010, now Pat. No. 8,675,755.

(60) Provisional application No. 61/223,982, filed on Jul. 8, 2009.

(51) Int. Cl.
*H03D 1/24* (2006.01)

(52) U.S. Cl.
USPC ........... 375/320; 375/262; 375/260; 375/267; 375/265; 375/299; 375/347; 375/349

(58) Field of Classification Search
USPC ......... 375/262, 260, 267, 265, 299, 347, 349, 375/320
See application file for complete search history.

(56) References Cited

U.S. PATENT DOCUMENTS

| | | |
|---|---|---|
| 2005/0201478 A1 | 9/2005 | Claussen et al. |
| 2006/0120477 A1 | 6/2006 | Shen et al. |
| 2006/0215603 A1 | 9/2006 | Nishio et al. |
| 2006/0286948 A1* | 12/2006 | Taniguchi et al. ............ 455/140 |
| 2007/0092018 A1 | 4/2007 | Fonseka et al. |
| 2007/0098103 A1 | 5/2007 | Murakami et al. |
| 2007/0104293 A1* | 5/2007 | Hiatt et al. .................... 375/329 |
| 2008/0123781 A1 | 5/2008 | Pisek et al. |
| 2008/0266160 A1* | 10/2008 | Goodall et al. ............... 341/155 |

(Continued)

OTHER PUBLICATIONS

Jungwon Lee et al., U.S. Appl. No. 12/940,778, "Method and Apparatus for Decoding Independently Encoded Signals," filed Nov. 5, 2010.

(Continued)

*Primary Examiner* — Kabir A Timory

(57) ABSTRACT

A computer-readable medium stores instructions causing one or more processors to demodulate a received signal including a plurality of user signals. Respective user data in each of at least some of the plurality of user signals is encoded with a respective finite state machine encoder having a respective number of states $S_i$, wherein i=1, 2, . . . , N, N being the number of users, and wherein at least a first user signal and a second user signal are encoded independently of each other. The instructions cause the processor(s) to calculate distances between transmit symbols in the received signal and an expected joint symbol value, and jointly decode, with a finite state machine decoder, user data in the demodulated received signal, including at least first user data corresponding to the first user signal, based on the calculated distances. The finite state machine decoder has $S_1^* S_2^* \ldots {}^* S_N$ states.

20 Claims, 9 Drawing Sheets

(56) References Cited

U.S. PATENT DOCUMENTS

| | | |
|---|---|---|
| 2009/0135926 A1 | 5/2009 | Tsouri et al. |
| 2010/0246720 A1 | 9/2010 | Wang et al. |
| 2010/0303176 A1 | 12/2010 | Lilleberg et al. |

OTHER PUBLICATIONS

Proakis, "5-2-7 Probability of Error for M-ary PSK," in Digital Communications, 4th ed., pp. 269-274, McGraw-Hill, 2001.

Viterbi, A.J.; Wolf, J.K.; Zehavi, E.; Padovani, R., "A pragmatic approach to trellis-coded modulation," Communications Magazine, IEEE vol. 27, Issue: 7, Publication Year: 1989, pp. 11-19.

Forney, "Chapter 9, Introduction to Convolutional Codes," Lecture Notes, available at http://ocw.mit.edu/courses/electrical-engineering-and-computer-science/6-451-principles-of-digital-communication-ii-spring-2005/lecture-notes/, pp. 117-134, 2003.

"IEEE Std 802.16 2009 (Revision of IEEE Std. 802.16/2004), IEEE Standard for Local and Metropolitan Area Networks: Part 16: Air Interface for Broadband Wireless Access Systems," The Institute of Electrical and Electronics Engineers, Inc., pp. 1-2082 (May 29, 2009).

"IEEE Std 802.16 2009 (Revision of IEEE Std. 802.16-2004), IEEE Standard for Local and Metropolitan Area Networks: Part 16: Air Interface for Broadband Wireless Access Systems," The Institute of Electrical and Electronics Engineers, Inc., May 29, 2009 (2082 pages).

Non-Final Office Action of U.S. Appl. No. 12/940,778, mailed Oct. 10, 2014.

Final Office Action of U.S. Appl. No. 12/940,778, mailed Jun. 24, 2014.

Non-Final Office Action of U.S. Appl. No. 12/940,778, mailed Dec. 2, 2013.

Non-Final Office Action of U.S. Appl. No. 12/940,778, mailed Jun. 19, 2013.

U.S. Appl. No. 12/940,778, filed Nov. 5, 2010.

\* cited by examiner

*PRIOR ART*

*PRIOR ART*

METHOD AND APPARATUS FOR JOINTLY DECODING INDEPENDENTLY ENCODED SIGNALS

CROSS-REFERENCE TO RELATED APPLICATION

This is a continuation of U.S. patent application Ser. No. 12/830,100, entitled "Method and Apparatus for Jointly Decoding Independently Encoded Signals" and filed on Jul. 2, 2010, which claims the benefit of U.S. Provisional Patent Application No. 61/223,982, entitled "Joint Decoding of Independently Encoded Multiple Users with Trellis Codes" and filed on Jul. 8, 2009. The disclosures of both of the above-referenced applications are hereby incorporated herein by reference.

FIELD OF THE DISCLOSURE

The present disclosure relates generally to communication systems and, more particularly, to mitigating interference in a receiver.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some communication networks, a communication device, such as a base station, simultaneously transmits different data to different communication devices, such as mobile stations. Similarly, in some communication networks, communication devices, such as mobile stations, simultaneously transmit different data to another communication device, such as a base station. In these scenarios, when the different data are transmitted at the same frequency, the different data act as interference to each other.

One technique for mitigating interference is referred to as successive interference canceling (SIC). In SIC, a strongest signal is first demodulated and decoded in the presence of interference caused by other signals. Next, the decoded data is re-encoded, re-modulated, and then subtracted from the other signals. Then, the second strongest signal is demodulated and decoded in the presence of interference caused by the remaining signals. Next, the decoded data is re-encoded, re-modulated, and then subtracted from the remaining signals. Then, the third strongest signal is decoded, and so on.

SUMMARY

In one embodiment, a tangible, non-transitory computer-readable medium stores instructions that, when executed by one or more processors of a first communication device, cause the one or more processors to demodulate a received signal including a plurality of user signals, the plurality of user signals including at least a first user signal corresponding to a first user and a second user signal corresponding to a second user. The first user signal corresponds to first user data that has been modulated independently of second user data corresponding to the second user signal. Respective user data in each of at least some of the plurality of user signals is encoded with a respective finite state machine encoder having a respective number of states $S_i$, wherein i=1, 2, . . . , N, wherein N is an integer equal to the number of users, wherein for user data that is not encoded, if any, $S_i=1$, and wherein at least the first user signal and the second user signal are encoded, with a respective finite state machine encoder, independently of each other. The instructions also cause the one or more processors to demodulate the received signal at least by calculating distances between (i) transmit symbols in the received signal and (ii) an expected joint symbol value. The expected joint symbol value corresponds to user data for multiple users including the first user and the second user. The instructions also cause the one or more processors to jointly decode, with a finite state machine decoder, user data in the demodulated received signal, including at least the first user data, based on the calculated distances, wherein the finite state machine decoder has $S_1{}^*S_2{}^* \ldots {}^*S_N$ states.

In another embodiment, a method implemented in a first communication device includes demodulating, in the first communication device, a received signal that includes a plurality of user signals, the plurality of user signals including at least a first user signal corresponding to a first user and a second user signal corresponding to a second user. The first user signal corresponds to first user data that has been modulated independently of second user data corresponding to the second user signal. Respective user data in each of at least some of the plurality of user signals is encoded with a respective finite state machine encoder having a respective number of states $S_i$, wherein i=1, 2, . . . , N, wherein N is an integer equal to the number of users, wherein for user data that is not encoded, if any, $S_i=1$, and wherein at least the first user signal and the second user signal are encoded, with a respective finite state machine encoder, independently of each other. The method also includes demodulating the received signal includes calculating distances between (i) transmit symbols in the received signal and (ii) an expected joint symbol value. The expected joint symbol value corresponds to user data for multiple users including the first user and the second user. The method also includes jointly decoding, in the first communication device and with a finite state machine decoder, user data in the demodulated received signal, including at least the first user data, based on the calculated distances, wherein the finite state machine decoder has $S_1{}^*S_2{}^* \ldots {}^*S_N$ states.

In another embodiment, an apparatus for demodulating and decoding a received signal that includes a plurality of user signals, the plurality of user signals including at least a first user signal corresponding to a first user and a second user signal corresponding to a second user, includes a demodulator configured to demodulate the received signal. The first user signal corresponds to first user data that has been modulated independently of second user data corresponding to the second user signal. Respective user data in each of at least some of the plurality of user signals is encoded with a respective finite state machine encoder having a respective number of states $S_i$, wherein i=1, 2, . . . , N, wherein N is an integer equal to the number of users, wherein for user data that is not encoded, if any, $S_i=1$, and wherein at least the first user signal and the second user signal are encoded, with a respective finite state machine encoder, independently of each other. The demodulator is configured to demodulate the received signal based on calculating distances between (i) transmit symbols in the received signal and (ii) an expected joint symbol value. The expected joint symbol value corresponds to multiple users including the first user and the second user. The apparatus also includes a finite state machine decoder configured to jointly decode user data in the demodulated received signal, including at least the first user data, based on the calculated distances, wherein the finite state machine decoder has $S_1{}^*S_2{}^* \ldots {}^*S_N$ states.

DETAILED DESCRIPTION

Figure 1A:
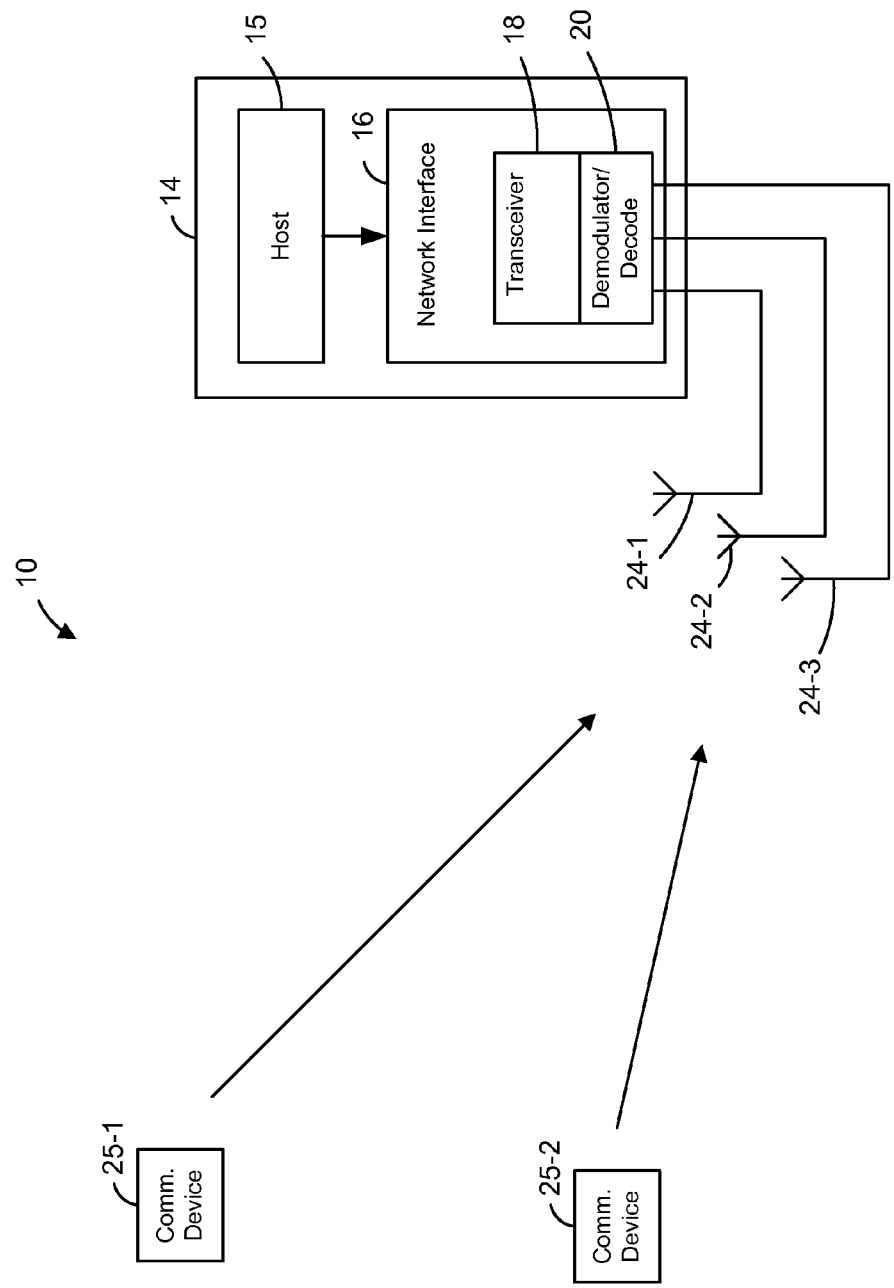
FIG. 1A is a block diagram of example wireless network, according to an embodiment, in which a communication device utilizes joint demodulation and joint decoding to mitigate interference.

FIG. 1A is a block diagram of an example wireless network 10, according to an embodiment, in which a communication device 14 utilizes joint demodulation and joint decoding to mitigate interference. The communication device 14 includes a host processor 15 coupled to a network interface 16. The network interface 16 includes a transceiver 18. The transceiver 18 is coupled to a plurality of antennas 24. Although three antennas 24 are illustrated in FIG. 1A, the communication device 14 can include different numbers (e.g., 1, 2, 4, 5, etc.) of antennas 24 in other embodiments. In an embodiment, the transceiver 18 includes a joint demodulator/decoder unit 20. The joint demodulator/decoder unit 20 will be described in further detail below.

The wireless network 10 also includes a plurality of communication devices 25. Although two communication devices 25 are illustrated in FIG. 1A, the wireless network 10 can include different numbers (e.g., 3, 4, 5, 6, etc.) of communication devices 25 in various scenarios and embodiments.

Each communication device 25 simultaneously, and at the same frequency, transmits data to the communication device 14. As a result, a signal transmitted by the communication device 25-1 acts as interference with respect to a signal transmitted by the communication device 25-2, and vice versa. As will be described in more detail below, the joint demodulator/decoder unit 20 jointly demodulates and jointly decodes the signal transmitted by the communication device 25-1 and the signal transmitted by the communication device 25-2, according to an embodiment. This joint demodulation and joint decoding mitigates interference caused by the signal transmitted by the communication device 25-1 with respect to the signal transmitted by the communication device 25-2, and vice versa. In some embodiments, more than two communication devices 25 simultaneously, and at the same frequency, transmit data to the communication device 14 resulting in similar interference. The joint demodulator/decoder unit 20 jointly demodulates and jointly decodes the signals transmitted by the more than two communication devices 25, according to some embodiments.

In an implementation in which the network 10 adheres to the Long Term Evolution (LTE) standard of the Third Generation Partnership Project (3GPP), the communication devices 25 are or include user equipment and the communication device 14 is or includes an evolved node B. In an implementation in which the network 10 adheres to the Institute for Electrical and Electronics Engineers (IEEE) 802.16e Standard (i.e., a WiMAX network), the communication devices 25 are mobile stations and the communication device 14 is a base station. In an implementation in which the network 10 is a wireless local area network (WLAN), the communication devices 25 are client stations and the communication device 14 is an access point. In other implementations, the communication devices 14, 25 can be referred to with different terminology.

Figure 1B:
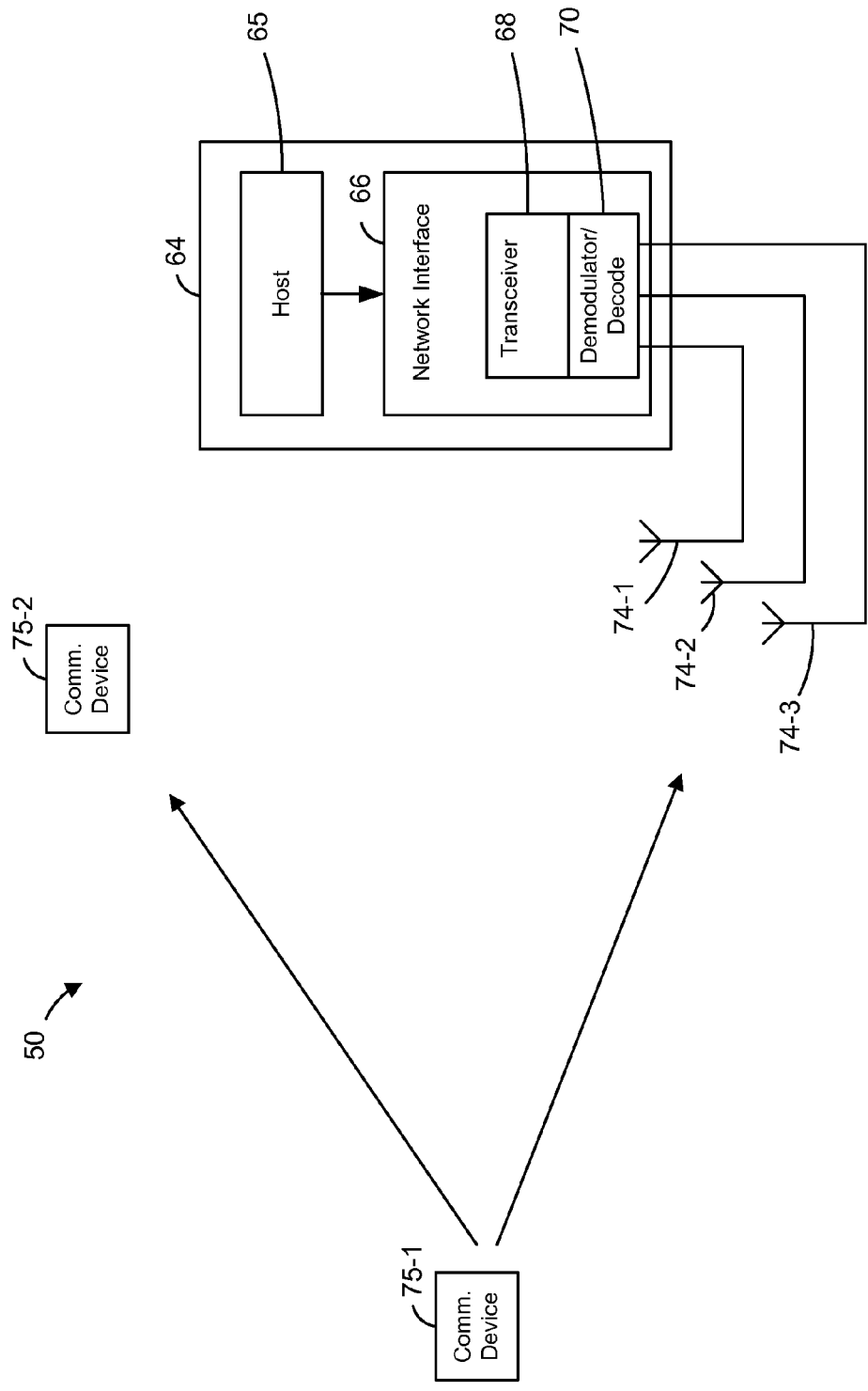
FIG. 1B is a block diagram of another example wireless network, according to another embodiment, in which a communication device utilizes joint demodulation and joint decoding to mitigate interference.

FIG. 1B is a block diagram of another example wireless network 50, according to an embodiment, in which a communication device 64 utilizes joint demodulation and joint decoding to mitigate interference. The communication device 64 includes a host processor 65 coupled to a network interface 66. The network interface 66 includes a transceiver 68. The transceiver 68 is coupled to a plurality of antennas 74. Although three antennas 74 are illustrated in FIG. 1B, the communication device 64 can include different numbers (e.g., 1, 2, 4, 5, etc.) of antennas 74 in other embodiments. In an embodiment, the transceiver 68 includes a joint demodulator/decoder unit 70. The joint demodulator/decoder unit 70 will be described in further detail below.

The wireless network 50 also includes a plurality of communication devices 75. Although two communication devices 75 are illustrated in FIG. 1B, the wireless network 50 can include different numbers (e.g., 3, 4, 5, 6, etc.) of communication devices 75 in various scenarios and embodiments.

The communication device 75-1 simultaneously, and at the same frequency, transmits different data to the communication device 75-2 and the communication device 64. The signal transmitted by the communication device 75-1 can be thought of as the sum of a first signal carrying data for the communication device 75-2 and a second signal carrying data for the communication device 64. When sum of the first and second signals is received by the communication device 64, the first signal carrying data for the communication device 75-2 acts as interference with respect to the second signal carrying data for the communication device 64. As will be described in more detail below, the joint demodulator/decoder unit 70 jointly demodulates and jointly decodes the signal transmitted by the communication device 75-1 (i.e., the sum of the first signal carrying data for the communication device 75-2 and the second signal carrying data for the communication device 64), according to an embodiment. The demodulator/decoder unit 70 then extracts the data intended for the device 64. This joint demodulation and joint decoding mitigates interference cause by the first signal carrying data for the communication device 75-2 with respect to the second signal carrying data for the communication device 64.

In some embodiments, the system 50 includes one or more communication devices 75-3, 75-4, etc., and the communication device 75-1 simultaneously, and at the same frequency, transmits different data to the communication devices 75-2, 75-3, . . . 75-4, etc., and the communication device 64. The joint demodulator/decoder unit 70 jointly demodulates and jointly decodes the signal transmitted by the communication device 75-1 (i.e., a sum of a first signal carrying data for the communication device 64, a second signal carrying data for the communication device 75-2, a third signal carrying data for the communication device 75-3, etc.), according to some embodiments. The demodulator/decoder unit 70 then extracts the data intended for the device 64.

In an implementation in which the network 50 adheres to the Long Term Evolution (LTE) standard of the Third Generation Partnership Project (3GPP), the communication devices 75-2 and 64 are or include user equipment and the communication device 75-1 is or includes an evolved node B. In an implementation in which the network 50 adheres to the Institute for Electrical and Electronics Engineers (IEEE) 802.16e Standard (i.e., a WiMAX network), the communication devices 75-2 and 64 are mobile stations and the communication device 75-1 is a base station. In an implementation in which the network 50 is a wireless local area network (WLAN), the communication devices 75-2 and 64 are client stations and the communication device 75-1 is an access point. In other implementations, the communication devices 64, 75 can be referred to with different terminology.

Although FIGS. 1A and 1B illustrate wireless communication networks, in other embodiments wired communication networks such as a cable television networks include communication devices similar to communication devices 14, 25, 64, 75 and in arrangements similar to the networks 10 and 50. For example, referring to FIG. 1A, devices similar to the devices 25 are, or are included in, cable modems, set top boxes televisions, etc., and a device similar to the device 14 is located at a cable television head end, in one embodiment. In this embodiment, a plurality of cable modems, set top boxes televisions, etc., simultaneously, and at the same frequency, transmit different data to the head end over a shared communication medium, such as a wired cable network. Referring to FIG. 1B, as another example, devices similar to the devices 64 and 75-2 are, or are included in, cable modems, set top boxes, televisions, etc., and a device similar to the device 75-1 is located at a cable television head end, in one embodiment. In this embodiment, a device at the head end simultaneously, and at the same frequency, transmits different data to a plurality of cable modems, set top boxes televisions, etc., over a shared communication medium, such as a wired cable network.

Figure 2:
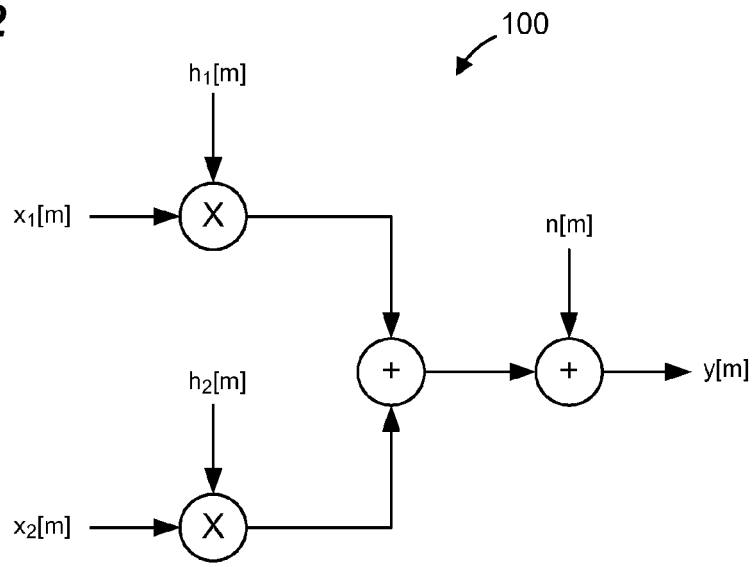
FIG. 2 is a block diagram of an example system model corresponding to systems such as the system of FIG. 1A.

Prior to discussing the joint demodulator/decoder units 20, 70 in more detail, an example system model will be described to aid in explanation of the joint demodulator/decoder units 20, 70. FIG. 2 is a block diagram of an example system model 100 corresponding to systems such as the system 10 of FIG. 1A, in which a plurality of communication devices (transmitters) simultaneously, and at the same frequency, transmit different data to a further communication device (receiver). FIG. 2 will be described with reference to FIG. 1A for ease of explanation, but the system model 100 is not limited to the system 10 of FIG. 1A. Moreover, although the example system model 100 includes two transmitters, the system model 100 can be extended to three or more transmitters by one of ordinary skill in the art in view of the disclosure and teachings herein.

A first communication device (e.g., device 25-1) transmits a signal $x_1[m]$ with a transmit power of $P_1[m]$, where m is a time index. A second communication device (e.g., device 25-2) transmits a signal $x_2[m]$ with a transmit power of $P_2[m]$. The signals $x_1[m]$ and $x_2[m]$ are sometimes referred to herein as user signals and as $x_k[m]$, where k is an index indicating the k-th user. In some embodiments, k is greater than two. The signal received by a third communication device (e.g., device 14) can be represented by:

$$y[m]=h_1[m]x_1[m]+h_2[m]x_2[m]+n[m] \qquad \text{Equ. 1}$$

where $h_1[m]$ is a channel gain from the first communication device (e.g., device 25-1) to the third communication device (e.g., device 14), $h_2[m]$ is a channel gain from the second communication device (e.g., device 25-2) to the third communication device (e.g., device 14), and n[m] is a suitable model of noise, such as independent identically distributed Gaussian noise with mean zero and a variance $\sigma^2$. The channel gains $h_1[m]$ and $h_2[m]$ are sometimes referred to herein as $h_k[m]$, where k indicates the channel gain from the k-th user to the receiver.

Figure 3:
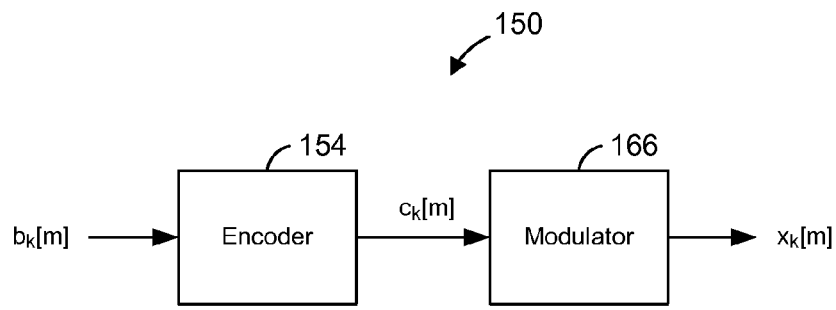
FIG. 3 is a block diagram of a prior art encoding and modulating unit.

FIG. 3 is a block diagram of an example prior art encoder/modulator system 150 that generates the k-th user signal $x_k[m]$ of FIG. 2. Thus, each device 25 (FIG. 1A) includes an encoder/modulator system the same as or similar to the encoder/modulator system 150, in an embodiment. In other embodiments, one or both devices 25 includes an encoder/modulator system different than the encoder/modulator system 150. In some embodiments, one or more of the devices does not encode data, in at least some scenarios. Thus, in some embodiments and/or scenarios, a device 25 does not include the encoder 154 and/or does not encode data prior to modulation.

Figure 4A:
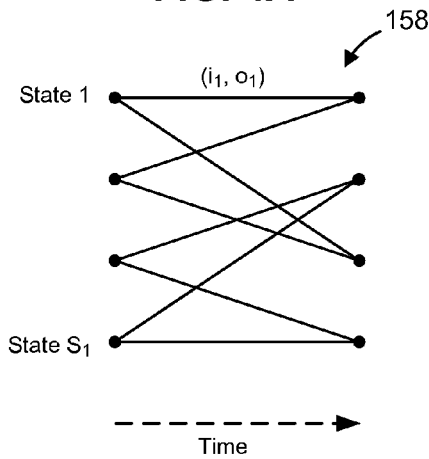
FIGS. 4A and 4B are example trellis diagrams for prior art encoders.
Figure 4B:
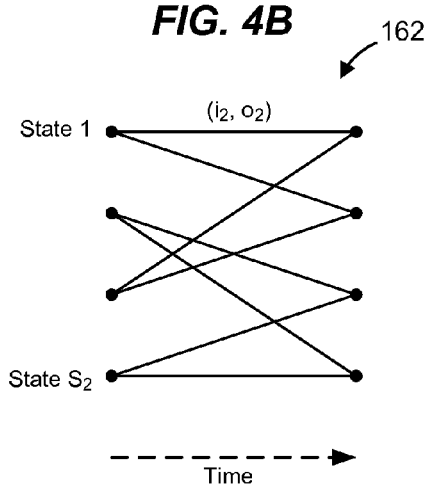

The system 150 includes an encoder 154 that encodes user data $b_k[m]$ to generate encoded user data $c_k[m]$. In one embodiment, $b_k[m]$ is a vector of information bits of size K for the k-th user, and $c_k[m]$ is a vector of encoded bits of size V for the k-th user. In some embodiments, the encoder 154 is a convolutional encoder and utilizes a convolutional encoding scheme. In some embodiments, the encoder 154 is a Trellis encoder. In one embodiment, the encoder 154 comprises a finite-state machine and is characterized by a finite state transition diagram or a trellis diagram. FIG. 4A is an example trellis diagram 158 corresponding to a convolutional encoder or Trellis encoder for generating encoded user data $c_1[m]$ based on user data $b_1[m]$. The trellis diagram 158 corresponds to an encoder having $S_1$ states. In the example 158, one output bit $o_1$ is generated for each input bit $i_1$. FIG. 4B is an example trellis diagram 162 corresponding to a convolutional encoder or a Trellis encoder for generating encoded user data $c_2[m]$ based on user data $b_2[m]$. The trellis diagram 162 corresponds to an encoder having $S_2$ states. In the example 162, one output bit $o_2$ is generated for each input bit $i_2$.

Figure 5:
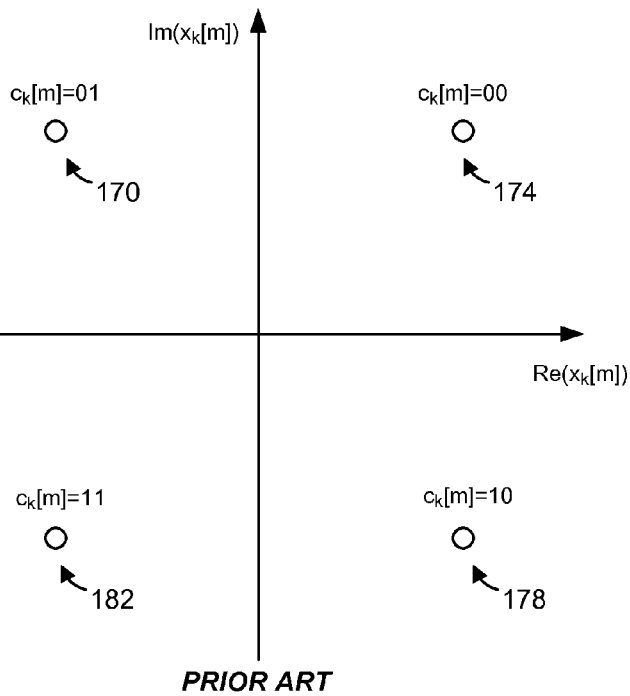
FIG. 5 is an example constellation diagram corresponding to a prior art modulator.

Referring again to FIG. 3, a modulator 166 modulates the encoded user data $c_k[m]$ to generate the k-th user signal $x_k[m]$. In one embodiment, the modulator 166 is a quadrature amplitude modulation (QAM) modulator. FIG. 5 is a diagram of an example QAM constellation illustrating operation of the modulator 166, in one embodiment. In the example of FIG. 5, the modulator 166 maps each pair of encoded user bits to one of four transmit symbols 170, 174, 178, 182. In other embodiments, a different size constellation is utilized, i.e., the modulator 166 maps encoded user bits to a number of transmit symbols other than four, such as 8, 16, 64, 128, etc. Moreover, in other embodiments, a modulation other than QAM is used, such as vestigial sideband modulation (VSB), etc.

Figure 6:
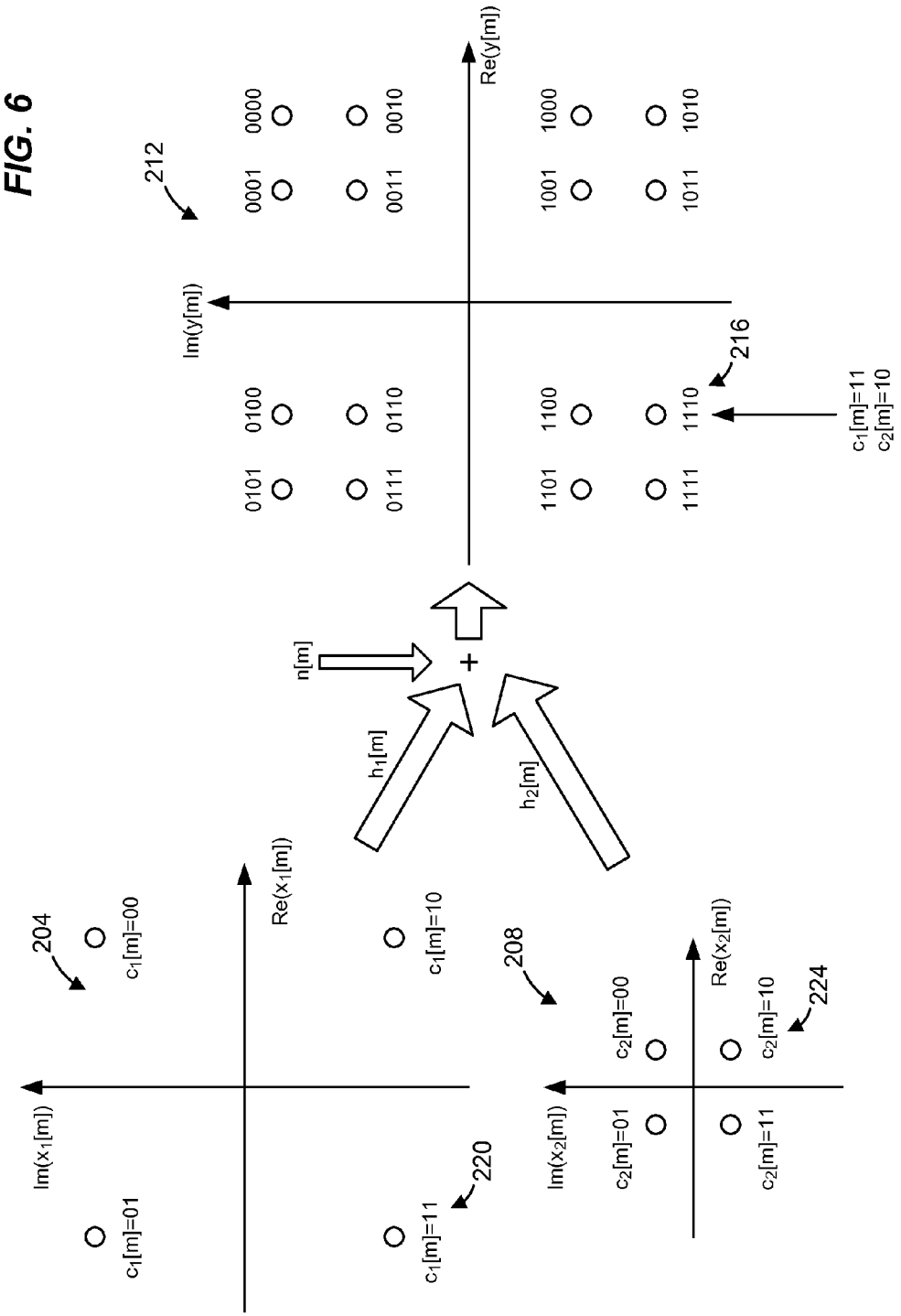
FIG. 6 is a diagram illustrating an example in which quadrature amplitude modulation (QAM) transmit symbols are transmitted simultaneously, and at the same frequency, by two communication devices to a third communication device.

FIG. 6 is a diagram illustrating an example in which QAM transmit symbols are transmitted simultaneously, and at the same frequency, by two communication devices (i.e., first and second communication devices) to a third communication device. In other embodiments, different constellations, different, numbers of transmit symbols, and/or non-QAM modulation is utilized. FIG. 6 is described with reference to FIG. 1A for ease of explanation. In FIG. 6, it is assumed that the power of the signal corresponding to the first user (communication device 25-1) is relatively strong compared to the power of the signal corresponding to the second user (communication device 25-2). For example, in one scenario, the communication device 25-1 is closer to the communication device 14 as compared to the distance between the communication device 25-2 and the communication device 14 and/or the communication device 25-1 transmits at a higher power than the communication device 25-2.

In the example of FIG. 6, both of the communication device 25-1 and the communication device 25-2 utilize 4-QAM modulation (also referred to as quadrature phase-shift keying (QPSK)). Thus, each of the communication device 25-1 and the communication device 25-2 includes a respective modulator that maps encoded data to four transmit symbols. The modulator of the communication device 25-1 maps encoded data to transmit symbols according to the constellation diagram 204 and the modulator of the communication device 25-2 maps encoded data to transmit symbols according to the constellation diagram 208. The transmit symbols in the constellation 204 are illustrated farther from the origin as compared to the transmit symbols in the constellation 208 to indicate the higher power of the signal corresponding to the first user (communication device 25-1) as compared to the power of the signal corresponding to the second user (communication device 25-2).

When the signals transmitted by the communication device 25-1 and the communication device 25-2 are transmitted simultaneously and are received by the communication device 14, the individual transmit symbols form joint transmit symbols having a constellation such as the constellation 212, in an ideal environment (e.g., no noise, etc). The received constellation 212 includes 16 constellation points corresponding to 16 joint transmit symbols. Each constellation point and each joint transmit symbol corresponds to data from both the communication device 25-1 and the communication device 25-2. For example, the constellation point 216 corresponds to $c_1[m]=11$ and $c_2[m]=10$. Constellation points in the constellation 212 are sometimes referred to expected joint symbol values. For instance, when the communication device 25-1 transmits the transmit symbol 220 and the communication device 25-2 simultaneously transmits the transmit symbol 224, it is expected that the communication device 14 will receive a joint symbol corresponding to the constellation point 216. But because of noise and other factors, the received joint transmit symbol typically will not be located exactly at the position of the constellation point 216.

Generally, because of noise and other factors, a received joint transmit symbol typically will not align exactly with the correct constellation point in the constellation 212. As will be described in more detail below, a joint demodulator of the communication device 14 determines distances between a received joint transmit symbol and each of at least some of the constellation points in the constellation diagram 212. The determined distances are utilized to determine to which constellation point (or expected joint symbol value) a received joint transmit symbol corresponds.

In a system such as the system 10 (FIG. 1A), the transceiver 18 of the communication device 14 knows the modulation coding scheme (MCS) used by the communication device 25-1 and the MCS used by the communication device 25-2. Thus, the demodulator/decoder unit 20 can determine the joint constellation 212 (FIG. 6) and utilize it to perform joint demodulation and joint decoding, as will be discussed below.

Figure 7:
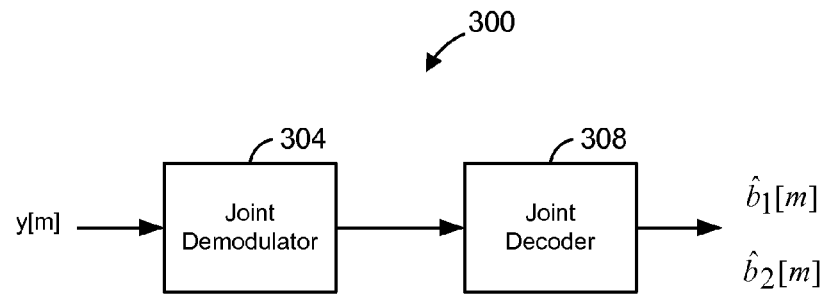
FIG. 7 is a block diagram of an example joint demodulation/decoding unit, according to an embodiment.

FIG. 7 is a block diagram of an example joint demodulator/decoder unit 300, according to an embodiment. The joint demodulator/decoder unit 300 is utilized as the joint demodulator/decoder unit 20 of FIG. 1A in one embodiment. In other embodiments, a joint demodulator/decoder unit different than the joint demodulator/decoder unit 300 is utilized as the joint demodulator/decoder unit 20 of FIG. 1A.

The joint demodulator/decoder unit 300 will be described with reference to FIG. 6 for ease of explanation. In some embodiments, the joint demodulator/decoder unit 300 utilizes a constellation different than the constellation 212 of FIG. 6 or utilizes non-QAM demodulation, such as VSB demodulation.

The joint demodulator/decoder unit 300 includes a joint demodulator 304 coupled to a joint decoder 308. The joint demodulator 304 determines distances between a received joint transmit symbol and at least some constellation points (or expected joint symbol values). In one embodiment, a determined distance between a received signal y[m] and a constellation point is represented as:

$$\|y[m]-(h_1[m]x_1[m]+h_2[m]x_2[m])\|^2 \qquad \text{Equ. 2}$$

where $h_1[m]x_1[m]+h_2[m]x_2[m]$ corresponds to the constellation point corresponding to a particular tuple of a transmit symbol $x_1[m]$ from the communication device 25-1 and a transmit symbol $x_2[m]$ from the communication device 25-2.

In one embodiment, the joint demodulator 304 determines the constellation points such as in the example constellation 212 (FIG. 6) based on modulation information for the first user signal and the second user signal. For instance, referring to FIG. 1A, in one embodiment, the communication device 25-1 transmits to the communication device 14 an indication of the MCS the communication device 25-1 will utilize to transmit to the communication device 14. In this embodiment, the communication device 25-2 similarly transmits to the communication device 14 an indication of the MCS the communication device 25-2 will utilize to transmit to the communication device 14. Using the MCS information, the joint demodulator/decoder unit 20 can determine the constellation points in the joint constellation, such as the example joint constellation 212 of FIG. 6.

The determined distances are provided to the joint decoder 308, which utilizes the determined distances to make decisions regarding the decoded user data to which the joint transmit symbols correspond. The joint decoder 308 includes a finite state machine having a number of states equal to $S_1 * S_2 * \ldots * S_N$, where $S_k$ is the number states employed by the corresponding encoder 154 at the communication device corresponding to the k-th user and where N is the number of communication devices simultaneously transmitting encoded user data. Thus, if there are two users and both users encode the data, the joint decoder 308 includes a finite state machine having a number of states equal to $S_1 * S_2$. In embodiments in which a device 25 does not include an encoder or does not implement encoding can be considered to have an encoder with only one state (i.e., $S_k=1$).

Figure 8:
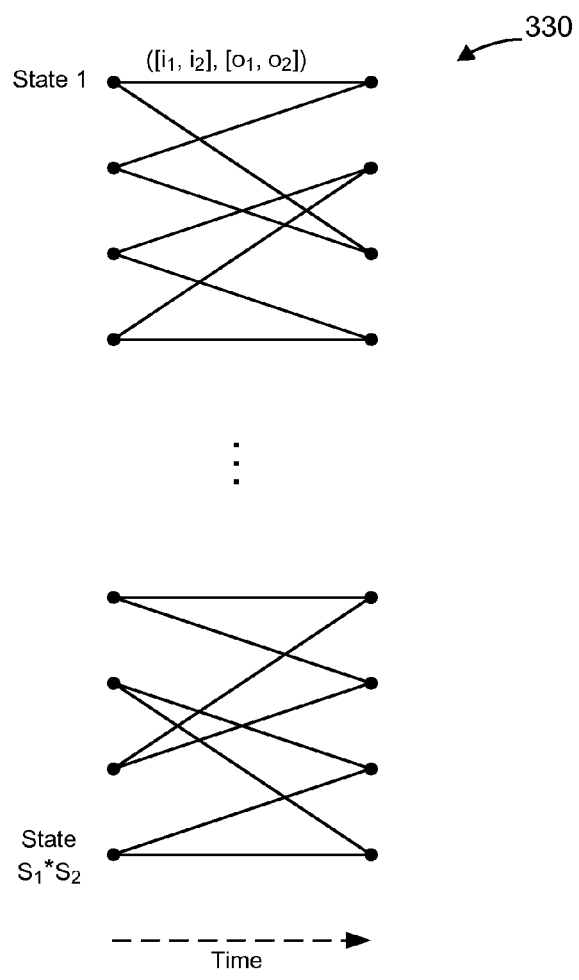
FIG. 8 is a joint trellis that can be utilized by the joint demodulation/decoding unit of FIG. 7, according to an embodiment.

In an embodiment, the finite state machine of the joint decoder 308 is represented as a trellis. FIG. 8 is a diagram of an example joint trellis 330 corresponding to a system having two users: a first user (e.g., corresponding to the communication device 25-1) and a second user (e.g., corresponding to the communication device 25-2). The trellis 330 corresponds to a two-user system having a number of states equal to $S_1*S_2$. The joint trellis 330 indicates state transitions in response to each combined input tuple $i_1$ and $i_2$, where each input tuple $i_1$ and $i_2$ corresponds to a constellation point (or expected joint symbol value). For each state transition, a combined output tuple $o_1$ and $o_2$ is generated, in an embodiment, where $o_1$ is decoded user data corresponding to the first user and $o_2$ is decoded user data corresponding to the second user.

In one embodiment, the joint decoder 308 implements maximum likelihood sequence decoding (MLSD) corresponding to the joint trellis 330. For example, the joint decoder 308 implements the Viterbi algorithm over the joint trellis 330, in one embodiment. In an embodiment in which the joint decoder 308 implements the Viterbi algorithm, the joint decoder 308 utilizes the determined distances generated by the joint demodulator 304 for branch metrics. In an embodiment in which the joint decoder 308 implements the Viterbi algorithm, the joint decoder 308 calculates path metrics utilizing the branch metrics, and utilizes the path metrics to generate the decoded user data $\hat{b}_1[m]$, corresponding to data transmitted by the communication device 25-1 and decoded user data $\hat{b}_2[m]$, corresponding to data transmitted by the communication device 25-2.

In another embodiment, the joint decoder 308 implements a maximum a posteriori (MAP) algorithm over the joint trellis 330. For example, the joint decoder 308 implements the BCJR algorithm (Bahl, Cocke, Jelinek, Raviv) over the joint trellis 330, in one embodiment. In an embodiment in which the joint decoder 308 implements the BCJR algorithm, the joint decoder 308 utilizes the determined distances generated by the joint demodulator 304 for branch metrics. In an embodiment in which the joint decoder 308 implements the BCJR algorithm, the joint decoder 308 carries out forward and backward recursion utilizing the branch metrics, and utilizes the forward and backward recursion to generate the decoded user data $\hat{b}_1[m]$ and the decoded user data $\hat{b}_2[m]$.

In at least some embodiments and/or scenarios, a joint demodulation/decoding unit such as described above permits communication devices, such as the communication devices 25 (FIG. 1A) to transmit at less power but achieve comparable performance (e.g., bit error rate, packet error rate, symbol error rate, etc.) as compared to a utilizing a prior art demodulator and decoder. An example is described below to illustrate a scenario in which less power compared to a SIC decoder achieves comparable performance.

In the example, first user signal is uncoded and is transmitted using QPSK. A second user signal is encoded with a ½ convolutional code and is transmitted using QPSK. An approximate symbol error rate with a convolutional code is:

$$P_e \approx KQ\left(\frac{d_{min}}{2\sigma}\right) \qquad \text{Equ. 3}$$

where $d_{min}$ is the minimum Euclidean distance of the error event, K is assumed to be a constant, Q( ) is the Q-function, and σ is a square root of noise power. For the first user signal (uncoded), the received signal power is $h_1^2 P_1$, where $P_1$ is the transmit power. The square of the minimum Euclidean distance for the first user signal is:

$$d_{min}^2 = 4h_1^2 P_1 \qquad \text{Equ. 4}$$

For the second user signal (coded), the received signal power is $h_2^2 P_2$, where $P_2$ is the transmit power. The square of the minimum Euclidean distance for the second user signal is:

$$d_{min}^2 = 20h_2^2 P_2 \qquad \text{Equ. 5}$$

As can be seen in Equations 4 and 5, the ½ convolutional code provides a 5-times increase in the square of the minimum Euclidean distance.

The following assumptions are made: 1) $P_{e,1} \sim P_{e,2} \sim P_{e,joint} \sim P_{target} = 10^{-5}$; 2) $\sigma^2 = 0$ dBm; 3) the first user signal (uncoded) needs 8.4 dB signal-to-noise ratio (SNR) to achieve $P_{target}$; and 4) the convolutional code utilized with the second user signal provides a 4 dB coding gain (i.e., the second user signal needs only 4.4 dB SNR to achieve $P_{target}$).

First, decoding with a prior art successive interference canceling (SIC) decoder is discussed. For the first user signal, the second user signal is treated as interference. The interference power is $10^{0.44}$ and the noise power is $10^0$, resulting in combined interference/noise power of 5.7 dBm. Thus, the required power for the first user signal is:

$$h_1^2 P_1 = 8.4 + 5.7 = 14.1 \text{ dBm} \qquad \text{Equ. 6}$$

For the second user signal, it is assumed that the first user signal is decoded correctly. Thus, the required power for the second user signal is:

$$h_2^2 P_2 = 8.4 - 4 = 4.4 \text{ dBm} \qquad \text{Equ. 7}$$

Next, decoding with a joint demodulator/decoder unit such as described above is discussed. As with the prior art SIC decoder, the required power for the second user signal is:

$$h_2^2 P_2 = 8.4 - 4 = 4.4 \text{ dBm} \qquad \text{Equ. 8}$$

On the other hand, if the first user signal is transmitted with an increase of 6 dB with respect to the second user signal, this will cause the 16 constellation points in the joint constellation to be uniformly distributed, which results in $P_{target}$ being achieved. Thus, the required power for the first user signal is:

$$h_2^2 P_2 = 4.4 + 6 = 10.4 \text{ dBm} \qquad \text{Equ. 9}$$

When Equation 9 is compared with Equation 6, it can be seen that the same performance is achieved with the joint demodulation/decoder unit, but with using 3.7 dB less power as compared with the SIC decoder.

Figure 9:
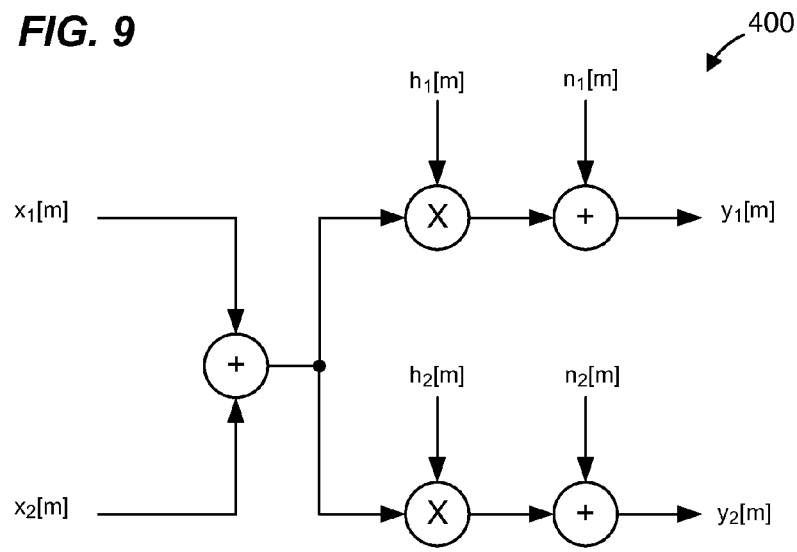
FIG. 9 is a block diagram of an example system model corresponding to systems such as the system of FIG. 1B, in which a communication device (transmitter) transmits different data simultaneously, and at the same frequency, to a plurality of other communication devices (receivers)

FIG. 9 is a block diagram of an example system model 400 corresponding to systems such as the system 50 of FIG. 1B, in which a communication device (transmitter) transmits different data simultaneously, and at the same frequency, to a plurality of other communication devices (receivers). FIG. 9 will be described with reference to FIG. 1B for ease of explanation, but the system model 400 is not limited to the system 50 of FIG. 1B. Moreover, although the example system model 400 includes two receivers, the system model 400 can be extended to three or more receivers by one of ordinary skill in the art in view of the disclosure and teachings herein.

A transmitting communication device (e.g., device 75-1) transmits a signal $x_1[m]$ with a transmit power of $P_1[m]$, where m is a time index. The transmitting communication device (e.g., device 75-1) transmits a signal $x_2[m]$ with a transmit power of $P_2[m]$. The signals $x_1[m]$ and $x_2[m]$ are sometimes referred to herein as user signals and as $x_k[m]$, where k is an index indicating the k-th user. In some embodiments, k is greater than two. The user signals are summed and then the sum is transmitted via different channels to a plurality of receiving communication devices (e.g., device 75-2 and 14). The signal received by the k-th user can be represented by:

$$y_k[m] = h_k[m](x_1[m] + x_2[m]) + n_k[m] \qquad \text{Equ. 10}$$

where $h_k[m]$ is a channel gain from the transmitting communication device (e.g., device 75-1) to the k-th receiving device (e.g., device 75-2 or device 64), and $n_k[m]$ is a suitable model of noise in the channel between the transmitting communication device (e.g., device 75-1) and the k-th receiving device (e.g., device 75-2 or device 64).

Figure 10:
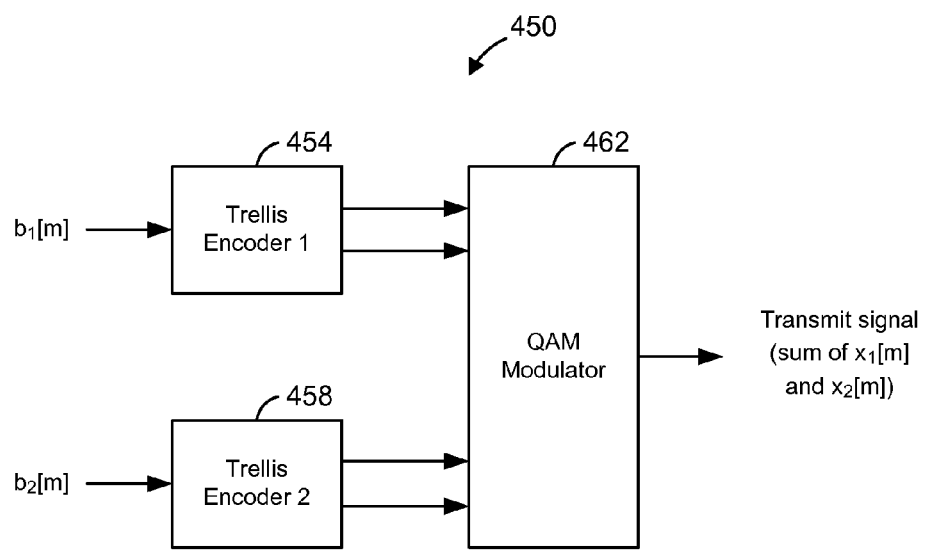
FIG. 10 is a block diagram of an example prior art encoder/modulator system that generates the transmit signal (i.e., the sum of $x_1[m]$ and $x_2[m]$) of FIG. 9.

FIG. 10 is a block diagram of an example prior art encoder/modulator system 450 that generates the transmit signal (i.e., the sum of the first and second user signals $x_1[m]$ and $x_2[m]$) of FIG. 9. Thus, the device 75-1 (FIG. 1B) includes an encoder/modulator system the same as or similar to the encoder/modulator system 450, in an embodiment. In other embodiments, the device 75-1 includes an encoder/modulator system different than the encoder/modulator system 450.

The system 450 includes an encoder 454 that encodes first user data $b_1[m]$ to generate encoded user data. In some embodiments, the encoder 454 is a convolutional encoder and utilizes a convolutional encoding scheme. In some embodiments, the encoder 454 is a Trellis encoder. In one embodiment, the encoder 454 comprises a finite-state machine and is characterized by a finite state transition diagram or a trellis diagram. The system 450 also includes an encoder 458 that encodes second user data $b_2[m]$ to generate encoded user data. In some embodiments, the encoder 458 is a convolutional encoder and utilizes a convolutional encoding scheme. In some embodiments, the encoder 458 is a Trellis encoder. In one embodiment, the encoder 458 comprises a finite-state machine and is characterized by a finite state transition diagram or a trellis diagram.

A modulator 462 modulates the encoded user data from the encoder 454 and the encoded user data from the encoder 458 to generate the sum of the first user signal $x_1[m]$ and the second user data $x_2[m]$. In one embodiment, assuming the first user signal is at a higher power than the second user signal, and assuming the first and second user signals have constellations similar to FIG. 6, the output of the modulator 462 forms a constellation similar to the constellation 212 of FIG. 6. In other embodiments, a different size constellation is utilized. Moreover, in other embodiments, a modulation other than QAM is used, such as vestigial sideband modulation (VSB), etc.

Figure 11:
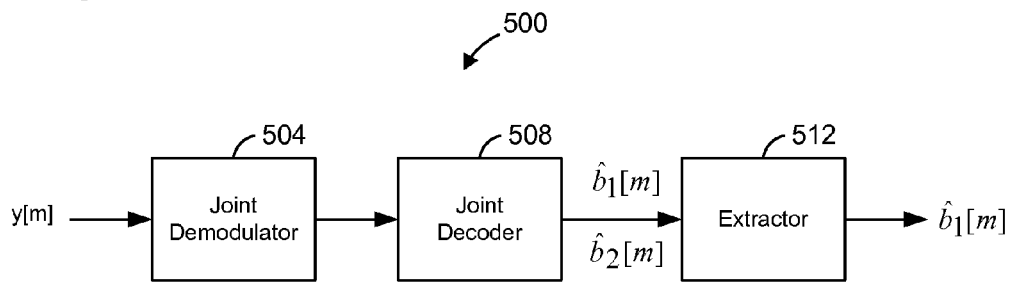
FIG. 11 is a block diagram of another example joint demodulator/decoding unit, according to an embodiment.

FIG. 11 is a block diagram of another example joint demodulator/decoding unit 500, according to an embodiment. The joint demodulator/decoder unit 500 is utilized as the joint demodulator/decoder unit 70 of FIG. 1B in one embodiment. In other embodiments, a joint demodulator/decoder unit different than the joint demodulator/decoder unit 500 is utilized as the joint demodulator/decoder unit 70 of FIG. 1B.

In an embodiment, the joint demodulator/decoding unit 500 includes a joint demodulator 504 and a joint decoder 508 similar to the joint demodulator 304 and the joint decoder 308, respectively, discussed with respect to FIG. 7. The joint demodulator 504 and the joint decoder 508 recover the first and second user data in a manner similar to the joint demodulator/decoding unit 300 discussed above. The joint demodulator/decoding unit 500 also includes an extractor unit 512 that extracts the first user data intended for the communication device 64.

The joint demodulator 504 determines distances between a received joint transmit symbol and at least some constellation points (or expected joint symbol values). In one embodiment, a determined distance between a received signal $y_k[m]$ and a constellation point is represented as:

$$\|y_k[m] - h_k[m](x_1[m] + x_2[m])\|^2 \qquad \text{Equ. 11}$$

where k indicates the k-th receive device, $h_k[m](x_1[m]+x_2[m])$ corresponds to the constellation point corresponding to a particular tuple of a transmit symbol $x_1[m]$ intended for the communication device 64 and a transmit symbol $x_2[m]$ intended for the communication device 75-2.

In one embodiment, the joint demodulator 504 determines the constellation points such as in the example constellation 212 (FIG. 6) based on modulation information for the first user signal and the second user signal. For instance, referring to FIG. 1B, in one embodiment the communication device 75-1 transmits to both the communication device 64 and the communication device 75-2 (i.e., broadcasts) an indication of the MCS the communication device 75-1 will utilize to transmit to the communication device 64 and an indication of the MCS the communication device 75-1 will utilize to transmit to the communication device 75-2. Using the MCS information, the joint demodulator/decoder unit 70 can determine the constellation points in the joint constellation, such as the example joint constellation 212 of FIG. 6.

The determined distances are provided to the joint decoder 508, which utilizes the determined distances to make decisions regarding the decoded user data to which the joint transmit symbols correspond. The joint decoder 508 includes a finite state machine having a number of states equal to $S_1 * S_2 * \ldots * S_N$, where $S_k$ is the number of states employed by the corresponding encoder 454, 458 at the transmit communication device 75-1 and where N is the number of receive communication devices 64, 75-2 to which the transmit device simultaneously transmits user data. Thus, if there are two users, the joint decoder 508 includes a finite state machine having a number of states equal to $S_1 * S_2$.

In an embodiment, the finite state machine of the joint decoder 508 is represented as a trellis, such as the example joint trellis 330 of FIG. 8. In one embodiment, the joint decoder 508 implements MLSD corresponding to the joint trellis 330. For example, the joint decoder 508 implements the Viterbi algorithm over the joint trellis 330, in one embodiment. In an embodiment in which the joint decoder 508 implements the Viterbi algorithm, the joint decoder 508 utilizes the determined distances generated by the joint demodulator 504 for branch metrics. In an embodiment in which the joint decoder 508 implements the Viterbi algorithm, the joint decoder 508 calculates path metrics utilizing the branch metrics, and utilizes the path metrics to generate the decoded user data $\hat{b}_1[m]$, corresponding to data intended for the communication device 64 and decoded user data $\hat{b}_2[m]$, corresponding to data intended for the communication device 75-2.

In another embodiment, the joint decoder 508 implements a MAP algorithm over the joint trellis 330. For example, the joint decoder 508 implements the BCJR algorithm over the joint trellis 330, in one embodiment. In an embodiment in which the joint decoder 508 implements the BCJR algorithm, the joint decoder 508 utilizes the determined distances generated by the joint demodulator 504 for branch metrics. In an embodiment in which the joint decoder 508 implements the BCJR algorithm, the joint decoder 508 carries out forward and backward recursion utilizing the branch metrics, and utilizes the forward and backward recursion to generate the decoded user data $\hat{b}_1[m]$ and the decoded user data $\hat{b}_2[m]$.

Referring now to FIG. 1B, in an embodiment, the communication device 75-2 has the same or a similar structure as the communication device 64. In this embodiment, the communication device 75-2 includes a joint demodulator/decoding unit 500, but where the extractor 512 extracts the second user data intended for the communication device 75-2.

Figure 12:
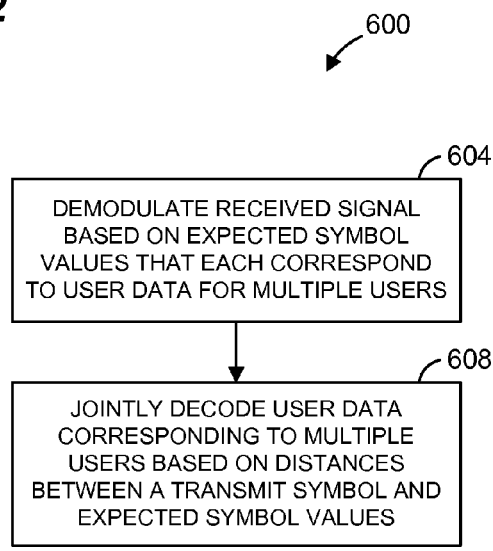
FIG. 12 is a flow diagram of an example method for processing a received signal that includes a plurality of user signals, according to an embodiment.

FIG. 12 is a flow diagram of an example method 600 for processing a received signal that includes a plurality of user signals including at least a first user signal and a second user signal. The first user signal corresponds to first user data that has been modulated independently of second user data corresponding to the second user signal. In various embodiments, the method 600 is implemented by the joint demodulation/decoding unit 20, the joint demodulation/decoding unit 70, the joint demodulation/decoding unit 300, and/or the joint demodulation/decoding unit 500. In other embodiments, the method 600 is implemented by a joint demodulation/decoding unit other than the joint demodulation/decoding unit 20, the joint demodulation/decoding unit 70, the joint demodulation/decoding unit 300, and the joint demodulation/decoding unit 500.

At block 604, the received signal is demodulated based on expected symbol values, wherein each expected symbol value corresponds to user data for multiple users. Referring to FIG. 6, for example, each constellation point (expected symbol value) corresponds to both first user data and second user data.

At block 608, user data for multiple users is jointly decoded based on determined distances between a transmit symbol in the received signal and the expected symbol values.

Figure 13:
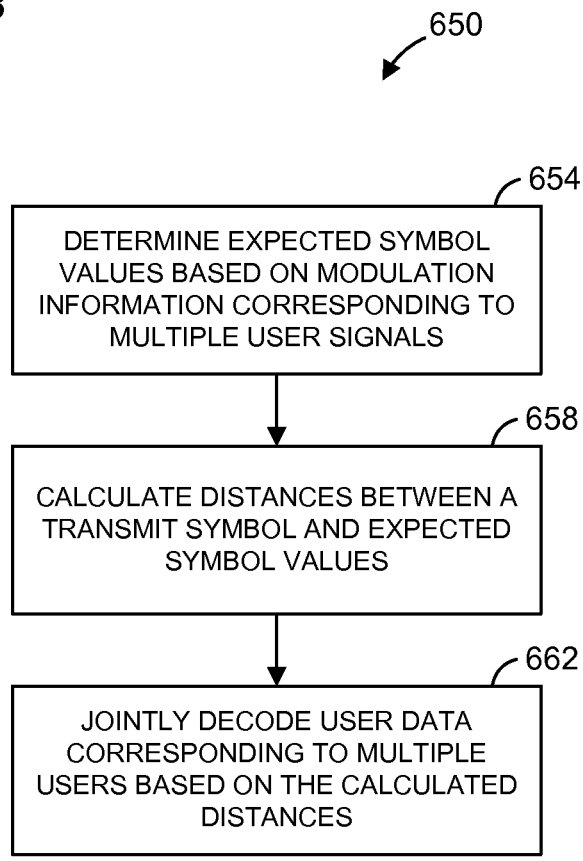
FIG. 13 is a flow diagram of another example method for processing a received signal that includes a plurality of user signals, according to an embodiment.

FIG. 13 is a flow diagram of another example method 650 for processing a received signal that includes a plurality of user signals including at least a first user signal and a second user signal. The first user signal corresponds to first user data that has been modulated independently of second user data corresponding to the second user signal. In various embodiments, the method 650 is implemented by the joint demodulation/decoding unit 20, the joint demodulation/decoding unit 70, the joint demodulation/decoding unit 300, and/or the joint demodulation/decoding unit 500. In other embodiments, the method 650 is implemented by a joint demodulation/decoding unit other than the joint demodulation/decoding unit 20, the joint demodulation/decoding unit 70, the joint demodulation/decoding unit 300, and the joint demodulation/decoding unit 500.

At block 654, each expected symbol value is determined based on modulation information corresponding to multiple user signals, and each expected symbol value corresponds to user data for multiple users. Referring to FIG. 6, for example, each constellation point (expected symbol value) corresponds to both first user data and second user data, and a joint demodulation/decoding unit determines the constellation points based on MCS information corresponding to the first user signal and the second user signal.

At block 658, distances between a transmit symbol in the received signal and the expected symbol values are determined. Referring to FIG. 6, for example, distances between a received transmit symbol and each of at least some of the constellation points (expected symbol values) in the constellation 212 are calculated.

At block 662, user data for multiple users is jointly decoded based on the calculated distances.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a field programmable gate array (FPGA), a complex programmable logic device (CPLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A tangible, non-transitory computer-readable medium storing instructions that, when executed by one or more processors of a first communication device, cause the one or more processors to:

demodulate a received signal including a plurality of user signals, the plurality of user signals including at least a first user signal corresponding to a first user and a second user signal corresponding to a second user, wherein the first user signal corresponds to first user data that has been modulated independently of second user data corresponding to the second user signal, respective user data in each of at least some of the plurality of user signals is encoded with a respective finite state machine encoder having a respective number of states $S_i$, wherein i=1, 2, ..., N, wherein N is an integer equal to the number of users, wherein for user data that is not encoded, if any, $S_i=1$, and wherein at least the first user signal and the second user signal are encoded, with a respective finite state machine encoder, independently of each other, and the instructions cause the one or more processors to demodulate the received signal at least by calculating distances between (i) transmit symbols in the received signal and (ii) an expected joint symbol value, wherein the expected joint symbol value corresponds to user data for multiple users including the first user and the second user; and jointly decode, with a finite state machine decoder, user data in the demodulated received signal, including at least the first user data, based on the calculated distances, wherein the finite state machine decoder has $S_1 * S_2 * \ldots * S_N$ states.

2. The tangible, non-transitory computer-readable medium of claim 1, wherein:
at least one of the plurality of user signals corresponds to user data that has been quadrature amplitude modulated; and
the computer-readable medium further stores instructions that, when executed by one or more processors of the first communication device, cause the one or more processors to calculate distances between (i) transmit symbols in the received signal and (ii) a plurality of constellation points, wherein each constellation point corresponds to user data for multiple users including the first user and the second user.

3. The tangible, non-transitory computer-readable medium of claim 1, wherein at least one of the user data is encoded with a respective Trellis encoder.

4. The tangible, non-transitory computer-readable medium of claim 3, wherein the finite state machine decoder includes a Viterbi decoder having $S_1 * S_2 * \ldots * S_N$ states.

5. The tangible, non-transitory computer-readable medium of claim 1, wherein the first user signal is transmitted by a second communication device, and the second user signal is transmitted by a third communication device.

6. The tangible, non-transitory computer-readable medium of claim 1, wherein:
the first user signal and the second user signal are generated by a second communication device;
the first user signal includes data intended for the first communication device; and
the second user signal includes data intended for a third communication device.

7. The tangible, non-transitory computer-readable medium of claim 1, wherein the instructions, when executed by one or more processors of the first communication device, cause the one or more processors to determine the expected joint symbol value based on modulation and coding scheme (MCS) information from two or more communication devices.

8. A method implemented in a first communication device, the method comprising:
demodulating, in the first communication device, a received signal that includes a plurality of user signals, the plurality of user signals including at least a first user signal corresponding to a first user and a second user signal corresponding to a second user, wherein
the first user signal corresponds to first user data that has been modulated independently of second user data corresponding to the second user signal,
respective user data in each of at least some of the plurality of user signals is encoded with a respective finite state machine encoder having a respective number of states $S_i$, wherein $i=1, 2, \ldots, N$, wherein N is an integer equal to the number of users, wherein for user data that is not encoded, if any, $S_i=1$, and wherein at least the first user signal and the second user signal are encoded, with a respective finite state machine encoder, independently of each other, and
demodulating the received signal includes calculating distances between (i) transmit symbols in the received signal and (ii) an expected joint symbol value, wherein the expected joint symbol value corresponds to user data for multiple users including the first user and the second user; and
jointly decoding, in the first communication device and with a finite state machine decoder, user data in the demodulated received signal, including at least the first user data, based on the calculated distances, wherein the finite state machine decoder has $S_1 * S_2 * \ldots * S_N$ states.

9. The method of claim 8, wherein:
at least one of the plurality of user signals corresponds to user data that has been quadrature amplitude modulated; and
calculating distances between each transmit symbol in the received signal and the expected joint symbol value includes calculating distances between (i) transmit symbols in the received signal and (ii) a plurality of constellation points, wherein each constellation point corresponds to user data for multiple users including the first user and the second user.

10. The method of claim 8, wherein at least one of the user data is encoded with a respective Trellis encoder.

11. The method of claim 10, wherein the finite state machine decoder includes a Viterbi decoder having $S_1 * S_2 * \ldots * S_N$ states.

12. The method of claim 8, wherein the first user signal is transmitted by a second communication device, and the second user signal is transmitted by a third communication device.

13. The method of claim 8, wherein:
the first user signal and the second user signal are generated by a second communication device;
the first user signal includes data intended for the first communication device; and
the second user signal includes data intended for a third communication device.

14. The method of claim 8, further comprising:
determining the expected joint symbol value based on modulation and coding scheme (MCS) information from two or more communication devices.

15. An apparatus for demodulating and decoding a received signal that includes a plurality of user signals, the plurality of user signals including at least a first user signal corresponding to a first user and a second user signal corresponding to a second user, the apparatus comprising:
a demodulator configured to demodulate the received signal, wherein
the first user signal corresponds to first user data that has been modulated independently of second user data corresponding to the second user signal,
respective user data in each of at least some of the plurality of user signals is encoded with a respective finite state machine encoder having a respective number of states $S_i$, wherein $i=1, 2, \ldots, N$, wherein N is an integer equal to the number of users, wherein for user data that is not encoded, if any, $S_i=1$, and wherein at least the first user signal and the second user signal are encoded, with a respective finite state machine encoder, independently of each other, and
the demodulator is configured to demodulate the received signal based on calculating distances between (i) transmit symbols in the received signal and (ii) an expected joint symbol value, wherein the expected joint symbol value corresponds to multiple users including the first user and the second user; and
a finite state machine decoder configured to jointly decode user data in the demodulated received signal, including at least the first user data, based on the calculated distances, wherein the finite state machine decoder has $S_1 * S_2 * \ldots * S_N$ states.

16. The apparatus of claim 15, wherein the demodulator is a quadrature amplitude modulation (QAM) demodulator configured to calculate distances between (i) transmit symbols in the received signal and (ii) a plurality of constellation points, wherein each constellation point corresponds to user data for multiple users including the first user and the second user.

17. The apparatus of claim 15, wherein the finite state machine decoder is a Viterbi decoder having $S_1 * S_2 * \ldots * S_N$ states.

18. The apparatus of claim 15, wherein the first user signal is transmitted by a first communication device, and the second user signal is transmitted by a second communication device.

19. The apparatus of claim 15, wherein:
the first user signal and the second user signal are generated by a first communication device; and
wherein the apparatus includes an extractor to extract data corresponding to the first user signal from an output of the decoder.

20. The apparatus of claim 15, wherein the demodulator is further configured to determine the expected joint symbol value based on modulation and coding scheme (MCS) information from two or more communication devices.

* * * * *